United States Patent [19]

Ferrell et al.

[11] Patent Number: 5,018,865

[45] Date of Patent: May 28, 1991

[54] PHOTON SCANNING TUNNELING MICROSCOPY

[76] Inventors: Thomas L. Ferrell, 1100 Hickory Trail Dr.; Robert J. Warmack, 12024 Ridgeland Dr., both of Knoxville; Robin C. Reddick, Rte. 3, Box 315, Louisville, all of Tenn. 37932

[21] Appl. No.: 260,926

[22] Filed: Oct. 21, 1988

[51] Int. Cl.$^5$ ............................................. G01B 11/24
[52] U.S. Cl. .................................... 356/376; 350/319; 356/317; 250/227.11
[58] Field of Search ................. 356/376, 301, 317, 73, 356/338; 250/458.1, 461.1, 461.2, 462.1, 306, 485, 227, 216, 239, 234; 350/319, 507, 534, 96.24

[56] References Cited

U.S. PATENT DOCUMENTS

| | | | |
|---|---|---|---|
| 3,975,084 | 8/1976 | Block . | |
| 4,604,520 | 8/1986 | Pohl | 250/216 |
| 4,662,747 | 5/1987 | Isaacson et al. | 356/317 |
| 4,725,727 | 2/1988 | Harder et al. | 250/227 |
| 4,917,462 | 4/1990 | Lewis et al. | 250/216 |

FOREIGN PATENT DOCUMENTS 0112401 12/1982 European Pat. Off. .

OTHER PUBLICATIONS

Near-Field Optical-Scanning Microscopy, Author—U. Durig et al, J. Appl. Phys. 59 (10), May 15, 1986.
Scanning Near-Field Optical Microscopy, Author—D. W. Pohl et al., preprint, to O-E/LASE '88 Conference, L.A., Jan. 1988.
Near-Field Scanning Optical Microscopy, Author—E. Betzig et al., Biophys., vol. 49, Jan. 1986.
Near-Field Optical Scanning Microscopy in Reflection, Author—U. T. Durig et al., Appl. Phys. Lett. 52 (4), Jan. 25, 1988.
Collection Mode Near-Field Scanning Optical Microscopy, Author—E. Betig et al., Appl. Phys. Lett. 51 (25), Dec. 21, 1987.
Electromagnetic Theory for Engineering Applications, W. L. Weeks, pp. 219, 239, Dec. 1963.
Bimorph-Driven x-y-z Translation Stage for Scanned Image Microscopy, J. R. Matey, R. S. Crandall and B. Brycki; Rev. Sci. Instrum. 58 (4), 4/1987.

Primary Examiner—Richard A. Rosenberger
Assistant Examiner—Hoa Q. Pham
Attorney, Agent, or Firm—Luedeka, Hodges, Neely & Graham

[57] ABSTRACT

A method and apparatus for photon scanning tunneling microscopy for examining a sample in a sample area on a surface at a subwavelength resolution is disclosed. The method comprises generating a near-field of photons at a surface containing a sample area. The near-field has an area that is larger than the sample area, and the near-field has an exponentially increasing intensity in a direction perpendicular to and towards the surface. The near-field is sampled with a probe which receives photons from that near-field that tunnel from the surface to the probe. The received photons are detected and a detector produces an output signal that is proportional to the number of photons received by the probe. The sample area is scanned with the probe in at least one direction parallel to the surface. While scanning, the probe may be maintained either at a position of a constant near-field intensity or at a position of constant distance from the surface. A photon scanning tunneling microscope for using the method is also disclosed.

41 Claims, 4 Drawing Sheets

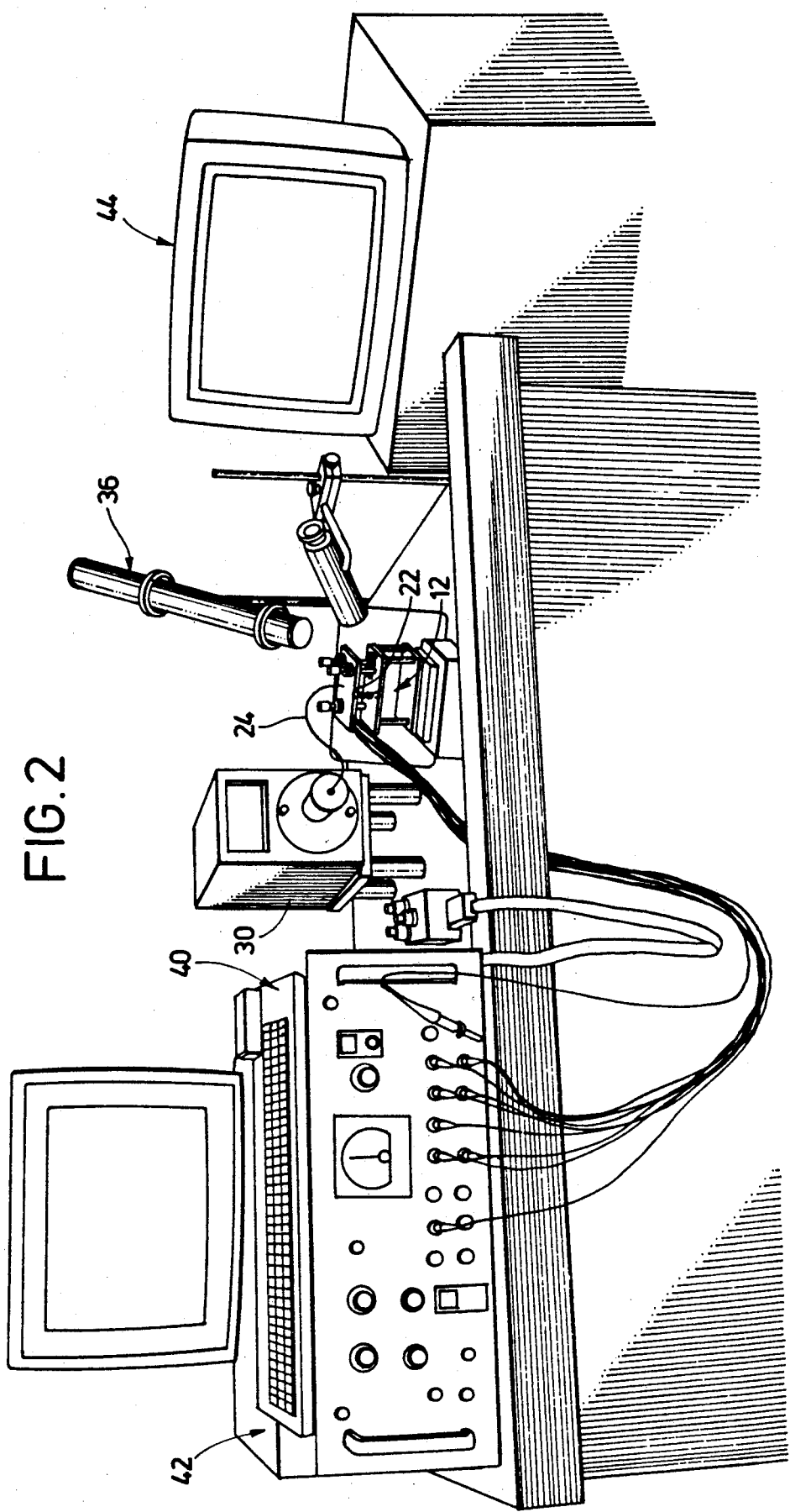

PHOTON SCANNING TUNNELING MICROSCOPY

FIELD OF THE INVENTION

The present invention relates to optical microscopes, and in particular relates to optical microscopes with subwavelength resolution. The invention also relates to microscopes which use a light tunneling phenomena. This invention was made with Government support under a contract awarded by the Department of Energy. The Government has certain rights in the invention.

BACKGROUND OF THE INVENTION

Until quite recently, the resolution of optical microscopes was limited by the wavelength of the light used. Particles smaller than one-half the wavelength could not be resolved. Transmission and scanning electron microscopy (TEM and SEM) were developed to resolve structures smaller than the wavelength of the visible light, but they were limited by the prerequisite of an electrically conducting sample.

The development of scanning tunneling microscopy allowed the resolution of structures as small as individual atoms. The original scanning tunneling microscope (STM) used tunneling electrons as the signal source within the microscope. Like TEM and SEM, this required an electrically conducting sample to supply the electrons.

There have been many attempts to exploit the near-field radiation of visible light photons. These near-field scanning microscopes (NFSM) directed light onto an aperture of subwavelength size connected to a detector. A near-field was generated at the aperture which interacted with a sample to produce a modulated near-field as the aperture was advanced proximate to the sample. Photons from the modulated near-field would then be detected. Thus, as the aperture moved across the sample, it would sense the modulations of the near-field. A raster scan of the sample by the aperture produced an image of the sample in the scanned area. Variations of this type of microscope have been developed, but in each case, the near-field phenomenon is created adjacent to a subwavelength size aperture and the useful size of the near-field is typically of the order of a wavelength in all dimensions. Because of its small size, this near-field is typically scanned across the sample.

Three methods have been used to maintain the aperture proximate to the sample during scanning. Electron tunneling feedback has been used to maintain aperture to sample separations of less than 1 nm. The method required coating both the sample (if the sample was non-conducting) and the aperture with a thin (approximately 20 nm) layer of a conducting material (e.q. gold). A second method used a constant height mode. The aperture was brought closer and closer to the sample until the desired resolution was obtained. In operation, the method was useful only for flat samples or flat areas of rough samples. The third method used a contact mode. The aperture was advanced until it contacted the surface, a tunneling current of photons was measured, and the aperture was retracted. This procedure was repeated as the aperture was scanned across the sample without any source of feedback. Again, the sample must be fairly flat and capable of withstanding contact with the aperture.

There are many types of samples, for example, biological samples, which may not survive the mechanical pressure of a contact in near-field scanning microscopes or a coating of the sample by a conducting surface. In addition, the techniques that use electron tunneling feedback to maintain proximity to the sample may also require vacuum conditions to best use electron tunneling.

Therefore, it is an object of the present invention to provide a means for high resolution optical microscopy applicable to a variety of specimen types including those that are nonconducting, non-flat, or of delicate structural composition. It is an additional object of the present invention to provide this microscopy under a variety of environmental conditions.

SUMMARY OF THE INVENTION

The present invention provides for a method and apparatus for near-field optical microscopy. The method uses a phenomenon of sample-modulated tunneling of photons in a near-field to produce information about the sample. In accordance with one aspect of the invention, a near-field is generated adjacent to a surface. The near-field has an intensity that increases perpendicular to and towards the surface and has substantially constant intensity in a plane substantially parallel to the surface. A sample is placed within the near-field and the presence of that sample changes the intensity distribution within the near-field. The intensity of the near-field around the sample is measured in at least two dimensions adjacent to the sample. The measurement produces an image corresponding to the area of the sample measured.

The preferred source of the near-field is a totally internally reflected (TIR) light beam. In a preferred embodiment, the light beam is reflected off an internal surface of a prism. This provides an evanescent field having an exponentially decaying intensity normal to the sample surface. A probe is moved into the evanescent field and preferably, the probe is a sharpened quartz optical fiber. The probe has a tip that is sharpened to a small dimension which can be subwavelength (i.e. less than about 500 nm). The presence of the probe will allow photons to tunnel from the surface to the probe.

The surface itself may also be the subject of this microscopy. In the same manner as above, the surface structure will modulate the near-field. The intensity of the near-field will vary with the changes and defects in the surface. In this way, the microscopy may be used to measure the surface in at least two-dimensions at a subwavelength resolution.

In a preferred embodiment the photons are conducted along the fiber to a detector. The detector produces a signal that is proportional to the number of photons that are tunneling to the probe and that number of photons is proportional to the intensity of the near-field in the vicinity of the probe. A different signal would be produced at different positions of the probe adjacent to the sample.

In a preferred embodiment, a feedback circuit is employed to regulate the intensity of the signal by varying the tip to sample distance. The feedback, thus, prevents the tip from contacting the sample. This technique is particularly suited to the study of dielectric surfaces, which are impossible to directly profile within an electron STM due to charging effects.

In an alternate embodiment, the tip is scanned over the sample at a constant height above the surface and the intensity of light received by the tip is measured. By scanning in a raster pattern at a constant height above the surface, a two dimensional picture of the intensity of the near-field is received by the probe. Varying intensity levels as the tip is scanned would provide information about a sample that is modulating the near-field or about the surface itself.

Also, the technique of the present invention will provide spectroscopic information. For example, as the probe is scanned parallel to the surface, the detected light could be fed into a spectrometer that would give information on the various optical properties of the sample in local areas with sizes smaller than the wavelength of light used in the field. This data would provide a map corresponding to the optical properties of the sample.

The resolution afforded by this invention is far better than that of standard optical microscopes. In addition, this invention may be used without resort to the high vacuum environments of electron microscopes.

The present invention uses the total internal reflection (TIR) of a light beam incident on an interface between materials of different refractive indices ($n_i$ and $n_t$) when the incident beam lies in the medium of higher index ($n_i$). A prism is an example of an optical device utilizing a total internal reflection surface (TIR surface). Total internal reflection takes place when the angle of incidence $\theta_i$ (related to the normal) exceeds the critical angle given by $\theta_c = \arcsin(n_t/n_i)$. For $\theta_i < \theta_c$, an evanescent near-field is produced in the medium of lesser index. The intensity of this field decreases exponentially with increasing distance from the interface according to Equation 1:

$$I = K \exp\{-2kz[\sin^2\theta_i - (n_t/n_i)^2]^{\frac{1}{2}}\} \quad (1)$$

where K is a constant of proportionality a magnitude of the wave vector of the incident light, and z is the distance from the interface surface. (As used herein the term near-field is a broad category to which evanescent fields belong. A near-field is any field whose effects become important at a distance within about 1 or 2 wavelengths from the source. An evanescent field is defined as that field whose intensity is described by Equation 1.) If another medium of index greater than $n_t$ is brought within the evanescent near-field, such as the tip of a sharpened optical fiber, tunneling occurs which is roughly analogous to that of electron tunneling through a finite barrier in quantum mechanics.

The exponential nature of the evanescent near-field leads to an "effective sharpness" for the probe tip. At any distance z from the surface, about 90% of the photons are coupled into the nearest 10% of the tip. Accordingly, a tip with a radius of R will have an "effective" radius of R/10. Therefore, a tip that might not be suitable for conventional near-field scanning microscopy would be quite suitable for use in this form of microscopy.

Photons from the incident beam tunnel through the region between the tip and sample and can be collected by a suitable detection system. The presence of a sample on the TIR surface will modulate the form of the evanescent near-field, and this modulation will manifest itself as spatial variations in the near-field intensity at a given height above the sample surface. These changes in intensity provide topographical information about the sample surface as well as information about the optical properties of the sample (for example, spatial variations in the index of refraction or the optical absorption of the sample). The spatial resolution is affected by the decay length of the evanescent near-field and by the size and shape of the tip.

A preferred embodiment of the invention is an instrument wherein a sample is placed on one surface of a prism and a laser beam is internally reflected from the opposite side of the prism surface. Thus, an evanescent field is created by the laser beam adjacent to the surface of the prism on which the sample is placed. A probe, a quartz fiber which has been etched into a sharp tip, is brought near to the sample and into the region of the evanescent near-field of the beam. As the probe tip enters the evanescent near-field, a portion of the otherwise totally reflected light beam will couple to the probe tip in a tunneling process. This light is conducted from the probe tip by means of fiber optics to a suitable detector, such as a photomultiplier tube. The photomultiplier tube produces a signal that is proportional to the number of photons tunneling to the probe tip. The intensity of the signal from the photomultiplier tube is held constant by a feedback circuit controlling separation distance between the probe tip and the prism surface. The position of the tip is controlled by mechanical and piezoelectric elements. Imaging of the sample is accomplished by scanning the probe tip over the surface in a standard raster pattern substantially parallel to the surface. The instantaneous light signal received by the probe tip is held constant during scanning by moving the probe in a direction perpendicular to the surface. The separation distance between the probe tip and the prism surface is monitored along with the scan position of the probe tip. Visual images are produced on an analog display monitor or a computer display corresponding to the separation distance of the probe from the prism surface as it moves in the raster pattern.

It will be understood that the prism and the surrounding medium such as air constitute first and second substances having differing indices of refraction. The surface of the prism on which the sample is placed constitutes a planar interface between the first and second surfaces and the near-field is produced adjacent to this planar interface.

The present invention does not require contact of the sample and the probe follows roughness features of the sample unlike some near-field scanning microscopes. Another advantage of the invention is that the resolution obtainable greatly exceeds that of conventional optical microscopy. Also, precise measurements of variations in sample topography are made available, unlike traditional optical and electron microscopes. Since there is no need for electron tunneling feedback or any other form of electron current between the sample and the probe, both insulating and conducting samples can be probed and imaged, unlike samples prepared for electron microscopy. Finally, the present invention is operable under a variety of environments. It is not restricted to vacuum operation.

BRIEF DESCRIPTION OF THE INVENTION

The present invention may be best understood by reference to the following detailed description of an exemplary embodiment when considered in conjunction with the drawings in which:

FIG. 2 is a drawing of a preferred embodiment of the invention; and

Figure 3:
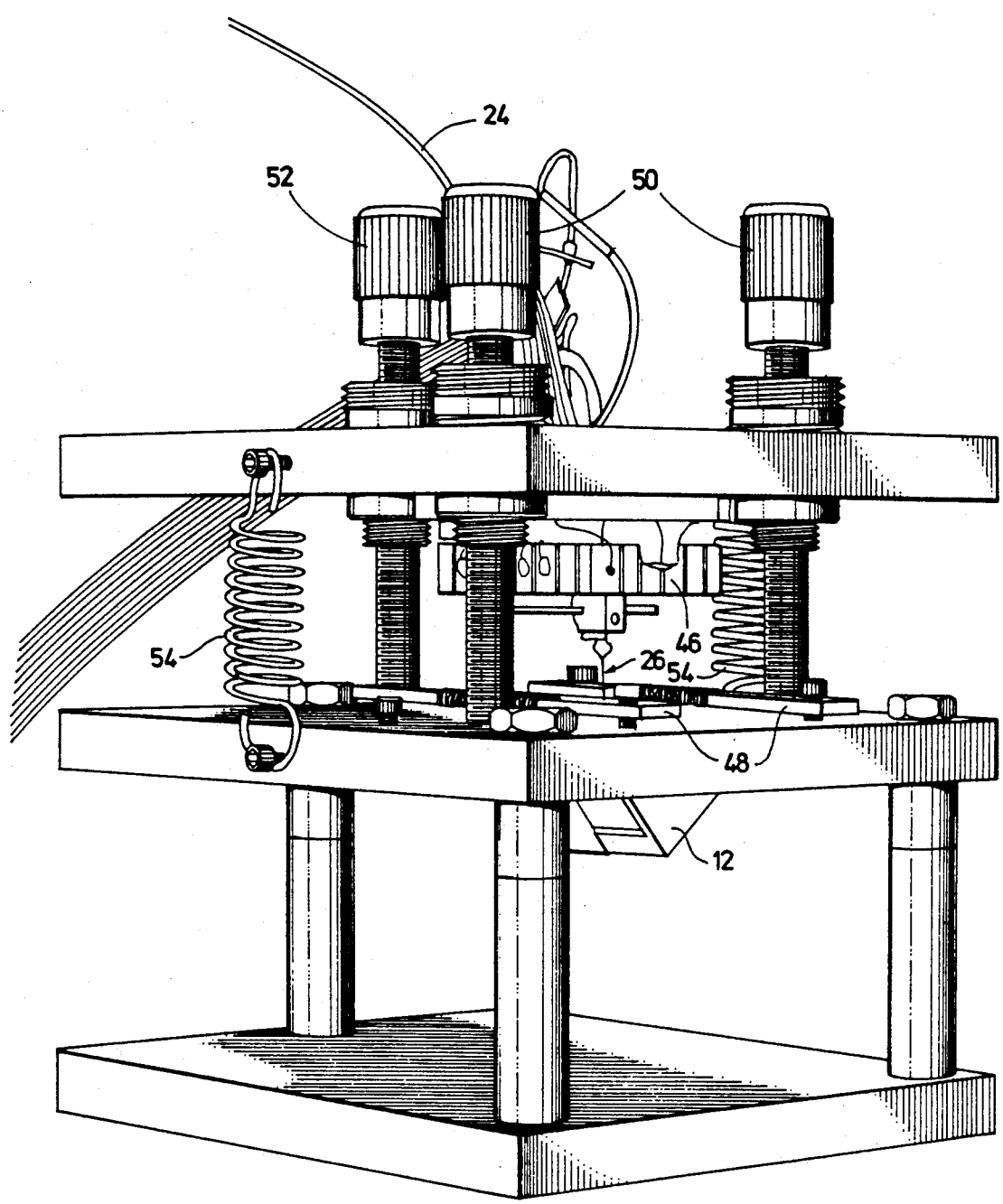
Figure 4:
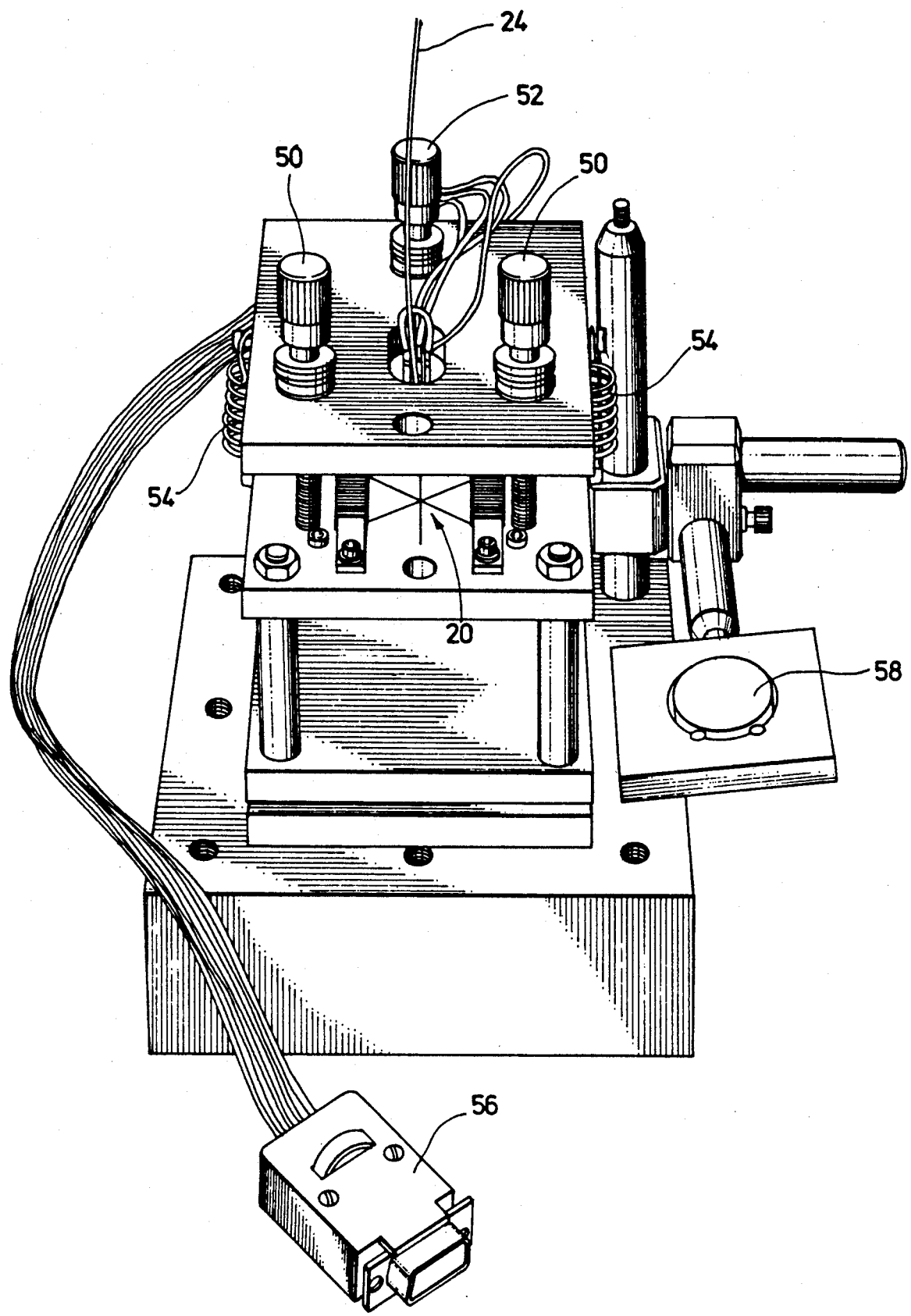

FIGS. 3 and 4 are perspective drawings of the probe and the sample area of a preferred embodiment of the invention, FIG. 4 being a view rotated 45° clockwise and from an angle elevated by about 30° with respect to the view in FIG. 3.

DETAILED DESCRIPTION OF THE INVENTION

Figure 1A:
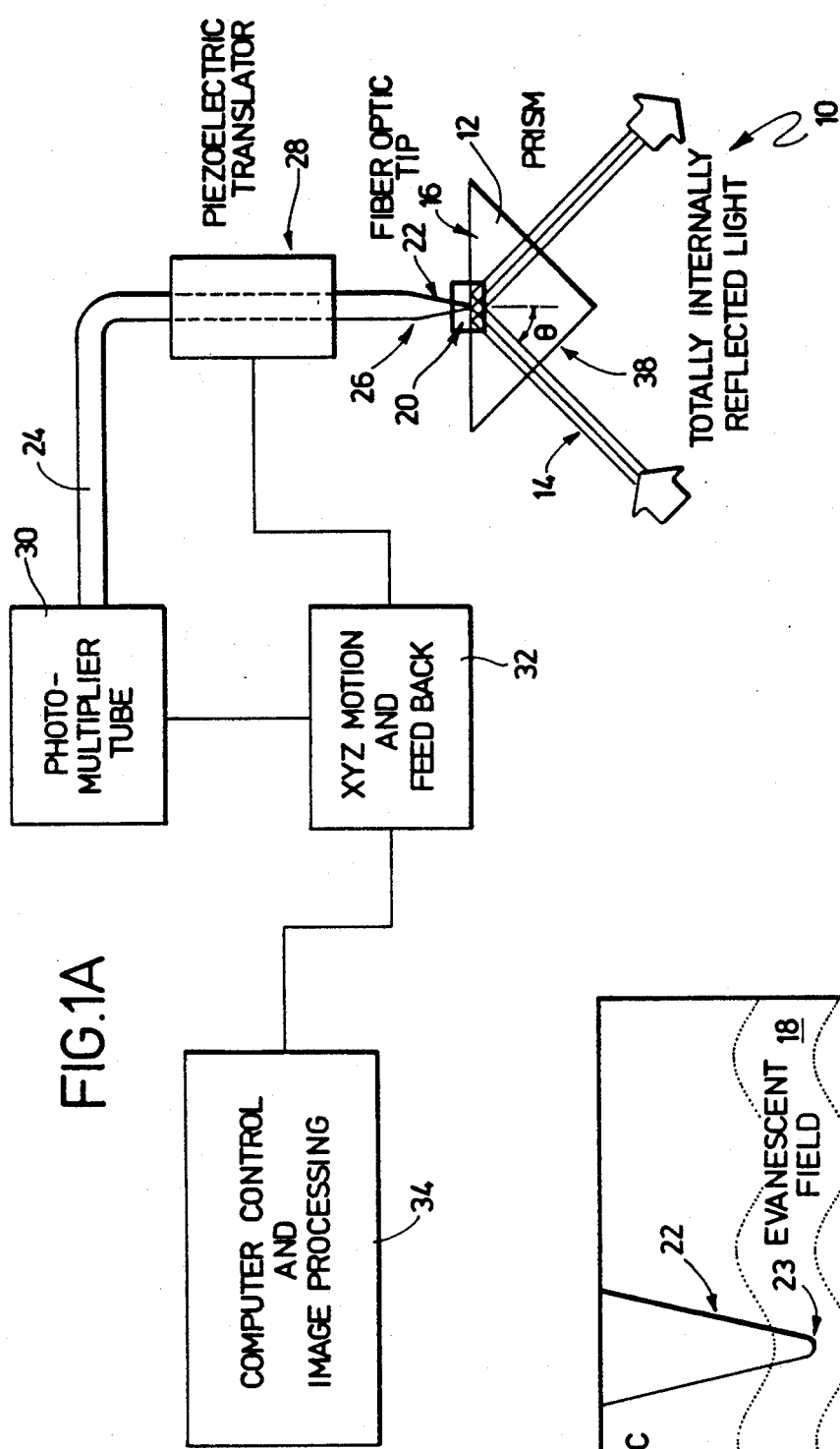
FIG. 1a is a block schematic diagram of a preferred embodiment of a photon scanning tunneling microscope.
Figure 1B:
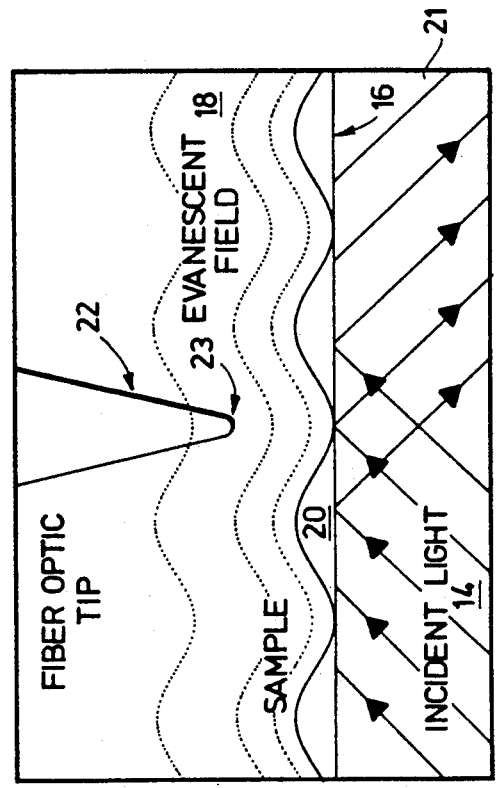
FIG. 1b is a diagram of a portion of the sample field showing the interaction of a fiber optic tip with a sample-modulated evanescent near-field.

Referring now to the drawings in which like reference characters designate like or corresponding parts throughout the several views, there is shown in FIGURE 1a a photon scanning tunneling microscope 10 embodying one form of the present invention. The microscope 10 is comprised of a prism 12 into which a laser beam 14 is directed at an angle of incidence $\theta_i$ such that the beam 14 is totally internally reflected (TIR) at a surface 16. Referring now to FIG. 1b as well as FIG. 1a, an evanescent near-field 18 is generated by the beam 14 being totally reflected at the surface 16. A sample 20 occupies a sample area 21 on the surface 16. The evanescent near-field 18 is much larger than the sample area 21, and the presence of the sample 20 on the surface 16 will modulate the evanescent near-field 18. This modulation will manifest itself as spatial variations in the near-field intensity at a given height above the sample surface. A fiber optic probe tip 22 is introduced into the evanescent near-field 18 such that photons will tunnel between the beam 14 at the surface 16 and the probe tip 22. The tip 22 is formed into a point 23 that may be, but need not be, smaller than the wavelength of the light of the beam 14 and it may be coated with a photon opaque material (such as metal) in order to produce a small aperture in combination with the small size of the point 23. The probe tip 22, unlike the probes used in conventional near-field scanning microscopes, need not be coated with an opaque material in order to achieve subwavelength resolution; forming the tip 22 with a point 23 less than a particular width produces resolution at least as good as an aperture of that width in a conventional near-field scanning microscope probe. The probe tip 22 is at one end of a quartz fiber 24. This end of the quartz fiber 24 makes up a probe 26. The probe 26 is mounted to a piezoelectric translator 28 so that the probe 26 may be scanned across the sample 20. The translator 28 moves the probe 26 horizontally over the sample 20 in a standard raster scan. An end opposite to the probe end of the quartz fiber 24 is connected to a photomultiplier tube 30 which detects the photons received by the probe 26. The tube 30 produces an output signal that is proportional to the number of photons received by the probe 26.

The output of the photomultiplier tube 30 is applied to an XYZ motion and feedback circuit 32. The circuit 32 provides signals to the translator 28 for the raster scan of the sample 20 by the probe 26. The circuit 32 has x- and y-direction controllers for generating x- and y-direction signals. These signals to the translator 28 move the probe 26 in the x and y directions. In addition, the circuit 32 monitors the output of the photomultiplier tube 30 to maintain the intensity of the evanescent near-field 18 at a constant value. As the probe 26 moves across the sample 20, the intensity of the evanescent near-field 18 will vary with the scan position of the probe 26. As the intensity varies, the feedback circuit 32 will generate a z-direction signal from a z-direction controller to move the probe 26 vertically with respect to the sample 20 and the surface 16. If the feedback circuit 32 receives a signal from the photomultiplier tube 30 indicating fewer photons being received by the probe 26, then the circuit 32 will direct the translator 28 to move the probe 26 closer to the sample 20 and the surface 16. The probe 26 will move further away from the sample 20 and the surface 16 if the photomultiplier tube 30 detects more photons. The XYZ motion and feedback circuit 32 provides position information to a computer control and image processing circuit 34. This circuit 34 determines a relative scan position and a relative vertical position of the probe 26 with respect to the surface 16 and the sample 20. An image is then generated based on the vertical position of the probe 26 with respect to the scan position of the probe 26. For example, the X-Y position (scan position) of the probe 26 corresponds to the X-Y pixel position in a standard video image, and the Z position (vertical position) of the probe 26 corresponds to pixel intensity. Alternatively, the Z position corresponds to pixel color so that the video image becomes a color coded topographical map.

Alternatively, the z-direction signal from the feedback circuit 32 may be bypassed. The probe 26 is advanced toward the surface 16 until a suitable photon current is detected. The probe 26 is then scanned across the sample 20 at a constant z-distance from the surface 16. The output of the photomultiplier tube 30 is then sent to the image processing circuit 34. Again, a relative horizontal position is determined as well as a relative photon current. An image is then generated based on the scan position of the probe 26 and the output of tube 30.

Referring to FIGS. 1 and 2, the laser beam 14 from a 7-mW helium-neon laser 36 is directed onto an internal face 38 of the prism 12 at an angle beyond the critical angle so that it experiences TIR. The beam 14 produces the evanescent near-field 18 whose intensity is modified by the presence of the sample 20 and is probed by the optical fiber probe tip 22. The optical fiber 24 delivers the light signal to the photomultiplier tube 30 which provides an electrical current signal proportional to the detected light intensity. This signal drives an electronic feedback circuit which regulates the distance between the probe tip 22 and the sample 20. The feedback electronics and other control electronics are located in a control unit 40.

The motion of the probe 26 is monitored and controlled by a computer 42, which also serves to collect and process the information generated by the scan of the probe 26 over the sample 20. As the tip is rastered laterally above the sample, a feedback circuit senses the current from the photomultiplier tube 30 and adjusts the separation of the tip 22 from the sample 20 so as to maintain a constant photomultiplier current. The tip height at each scan point is monitored and stored by the computer 42 and forms the coordinates for constructing a three-dimensional image replica of the surface of the sample 20. The computer 42 is subsequently used to process the data and form a gray-scale image of the sample 20 which is displayed on a graphics monitor 44.

The geometry of this preferred embodiment of the invention provides a probe tip 22 that is mounted on a piezoelectric translator and scanned over a stationary sample. Referring now to FIG. 3, the invention employs a piezoelectric bimorph scanner 46 to achieve tip motion along three orthogonal axes. The scanner 46 is made from PZT-5H piezoelectric ceramic bimorphs and has a minimum resonant frequency of 1.75 kHz. The scanner provides three mutually orthogonal motions, one each for x-, y- and z-directions. The scanner 46 has a range of 10 micrometers in a direction parallel to the surface 16 and 6 micrometers perpendicular to it. The probe 26 is attached to the scanner 46 and the rest of the quartz fiber 24 extends to the photomultiplier tube 30.

A sample 20 is placed on the surface 16 of the prism 12 and coupled to it optically by an index-matching substance. The entire sample arrangement is held rigidly in place by clamps 48. Coarse adjustment of the tip 23-sample 20 separation is accomplished by micrometer screws 50 with fine adjustment being controlled by an additional micrometer screw 52 via a lever reduction type of geometry. Springs 54 serve to mechanically stabilize the entire apparatus and ensure positive control of the relative position of the tip 22 above the sample 20.

Referring now to FIG. 4, electrical connection to the control unit 40 is made via a pin connector plug 56. Light is totally internally reflected from the sample 20 by directing laser beam 14 into the prism 12 using a mirror arrangement 58 so that the incident angle ($\theta_i$ in FIG. 1A) is greater than or equal to the critical angle required to achieve TIR. The fiber optic tip 22 is first mechanically positioned over the sample 20 with the micrometer adjustment screws 50, 52 and then it is brought into the evanescent near-field region with the scanner 46.

From the foregoing, it may be seen that the present invention provides for a method and apparatus for optical microscopy by means of sample-modulated tunneling of photons to a probe. The present invention provides a means for high resolution optical microscopy applicable to a variety of specimen types including those that are nonconducting, nonflat, or of delicate structural composition. Since there is no requirement for an electron current in this type of microscopy, the present invention can provide microscopy of this high resolution under a variety of environmental conditions.

Although a preferred embodiment is described above, it is understood that the invention is capable of numerous rearrangements, modifications and substitutions of parts without departing from the scope of the invention as defined by the appended claims.

What is claimed is:

1. A method for detecting properties of a near-field of light adjacent to a sample area on a surface comprising:
   generating a near-field of light adjacent to the surface, the near-field having an increasing intensity in a direction perpendicular to and towards the surface and having substantially constant intensity at a substantially constant distance from the surface;
   positioning a physical probe within the near-field and adjacent to the sample area to couple with and receive light from the near-field; and
   monitoring the amount of light received by the probe and producing an output signal corresponding to properties of the near-field adjacent to the sample area.

2. The method of claim 1 wherein the near-field is an evanescent field.

3. The method of claim 1 further comprising the step of disposing a sample onto the sample area to change the intensity distribution of the near-field.

4. The method of claim 3 wherein said generating step comprises:
   providing first and second substances having differing indices of refraction;
   providing an interface between said first and second substances which constitutes the surface;
   directing light through the first substance to intersect the interface at an angle of incidence sufficiently large to produce total internal reflection and to produce a near-field adjacent to the interface in the second substance.

5. The method of claim 1 wherein said monitoring step further comprises:
   scanning the probe in a scan pattern adjacent to the sample;
   controlling the position of the probe in the near-field by moving the probe in a direction substantially normal to the surface as the probe is scanning through the scan pattern so that the probe receives substantially the same amount of light during the scanning; and
   monitoring the probe position and outputting information corresponding to the distance between the probe and the surface as the probe tip scans through the scan pattern.

6. The method of claim 1 wherein said monitoring step further comprises:
   scanning the probe in a scan pattern adjacent to the sample are while holding the probe at a substantially constant distance from the surface; and
   monitoring the position of the probe and the amount of light received by the probe as the probe scans through the scan pattern; and
   outputting data as to the positions of the probe as it moves through the scan pattern and as to the amount of light received by the probe at each of the positions.

7. The method of claim 1 wherein the probe is positioned at a distance from the surface that is less than about two wavelengths of the light.

8. The method of claim 1 further comprising:
   scanning the probe in a predetermined pattern adjacent to the sample area; and
   measuring the light received by the probe during the scanning to generate light intensity distribution information.

9. The method of claim 1 wherein said positioning step comprises:
   providing a probe constructed only of a light conducting substance and having a probe tip; and
   positioning said probe tip within said near-field and adjacent to the sample area to couple with and receive light from the near-field.

10. A method of photon scanning tunneling microscopy adjacent to a sample area on a surface, said method comprising:
    generating a near-field of light adjacent to the surface, the near-field having an increasing intensity in a direction normal to and towards the surface;
    sampling the near-field with a probe that receives photons tunneling between the surface and the probes, the number of photons being related to the intensity of the near-field at the position of the probe;
    detecting the photons received by the probe;

producing an output signal that is substantially proportional to the number of photons received by the probe;

scanning adjacent to a sample area with the probe in at least one direction; and monitoring the output signal as the probe moves to produce output information corresponding to light intensity distribution adjacent to the sample area.

11. The method of microscopy of claim 10 wherein the near-field is an evanescent near-field.

12. The method of microscopy of claim 10 wherein generating a near-field of light further comprises:

producing a beam of light;

introducing the beam into a body of transparent material with at least one surface having an inner side and an outer side; and disposing the beam within the transparent material to produce a total internal reflection of the beam at the inner side of said surface, the reflection producing the near-field adjacent to the outer side of the surface.

13. The method of microscopy of claim 10 wherein the surface is generally planar and wherein scanning adjacent to the sample area with the probe further comprises:

moving the probe a controlled distance in a firstdirection parallel to the surface; and moving the probe a controlled distance in a second direction different from the first direction and parallel to the surface.

14. The method of microscopy of claim 10 further comprising partially covering the probe with a proton opaque material, forming an aperture in the opaque material on that portion of the probe most proximate to the surface, the aperture being smaller than the wavelength of the photons being received by the probe.

15. The method of claim 7 further comprising the step of placing a sample into the sample area on the surface to optically change the intensity distribution of the near-field.

16. The method of microscopy of claim 10 further comprising:

maintaining the probe at a substantially constant distance normal to the surface while the probe is scanning adjacent to the sample area; and monitoring the output signal during said scanning to detect changes in the light intensity distribution adjacent to the sample area.

17. The method of claim 16 further comprising:

determining the magnitude of the output signal while scanning adjacent to the sample area;

generating a level signal that is representative of the magnitude of the output signal;

determining a scan position of the probe while scanning adjacent to the sample area;

generating a scan position signal that is representative of the scan position; and displaying the level signal as a function of the scan position signal.

18. The method of claim 10 wherein the monitoring step further comprises:

maintaining the probe at a position such that the light intensity received by the probe is substantially constant while the probe is scanning adjacent to the sample area; and monitoring the position of the probe during said scanning to produce the output information, whereby the output information indicates the probe position which corresponds to light intensity distribution adjacent to the sample area.

19. The method of microscopy of claim 18 wherein maintaining the probe at a position of constant near-field intensity further comprises:

moving the probe in a direction substantially normal to the surface a controlled distance; and controlling the movement of the probe in the direction substantially normal to the surface, by moving the probe further away from the surface when the output signal increases and moving the probe closer to the surface when the output signal decreases and holding the output signal at a substantially constant level as the probe is scanning adjacent to the sample area.

20. The method of microscopy of claim 19 further comprising:

determining distances between the probe and the surface while scanning adjacent to the sample area;

generating a distance signal that is representative of the distances;

determining a scan position of the probe;

generating a scan position signal that is representative of the scan position; and displaying the distance signal as a function of the scan position signal.

21. A photon scanning tunneling microscope comprising:

a surface on which a sample area is defined;

means for generating a near-field of light adjacent to the surface, said near-field having a substantially exponentially decreasing intensity in a direction perpendicular to and away from said surface and, in the absence of a sample on the sample area, having a constant intensity throughout an area that is equidistant from the surface and is adjacent to the sample area;

a probe for sampling said evanescent near-field, said probe receiving photons from said near-field that tunnel between said surface and said probe;

a detector for detecting the photons received by said probe and producing a control signal that is proportional to the number of photons received by said probe;

means for moving said probe and for scanning said probe through a pattern in the near-field adjacent to said sample area whereby the control signal varies as a function of the light intensity distribution adjacent to the sample area; and monitoring means for monitoring the control signal as said probe moves through the pattern to produce data corresponding to the light intensity distribution adjacent to the sample area.

22. The microscope of claim 21 further comprising means for maintaining the position of said probe at a substantially constant distance normal to said surface while said probe is scanning the sample area.

23. The microscope of claim 21 further comprising means for responding to the control signal to maintain said probe at a position of constant light intensity whereby the distance of said probe from said surface varies as a function of the light intensity distribution adjacent to the sample area.

24. The microscope of claim 21 wherein said means for generating a near-field of photons further comprises:

a source of collimated light for providing a beam of light;

a body of transparent material with at least one flat surface constituting said surface on which the sample area is defined; and means for introducing said beam into said body whereby said beam contacts an inner side of said surfaces at an angle equal to or greater than a critical angle that will produce a total internal reflection of said beam, said reflection producing said evanescent near-field adjacent to an outer side of said surface.

25. The microscope of claim 24 wherein said body of transparent material is a quartz prism.

26. The microscope of claim 24 wherein said source of collimated light is a laser and said beam of light is a laser beam.

27. The microscope of claim 21 wherein said monitoring means comprises:

means for monitoring the near-field proximate to the sample area and producing an output signal corresponding thereto; and means for producing the output signal to correspond to the position of said probe as it moves through the pattern.

28. The microscope of claim 27 wherein said monitoring means further comprises:

means for determining distances between said probe and said surface while scanning said surface and for generating a distance signal that is representative of said distances;

means for determining scan positions of said probe in a plane adjacent to said surface while scanning said surface and for generating a position signal that is representative of said position; and means for displaying said distance signal as a function of said position signal.

29. The microscope of claim 27 wherein said monitoring means further comprises:

a first means for moving said probe in a first direction, said first means being capable of moving said probe a controlled distance smaller than the wavelength of the photons of said near-field; and a second means for moving said probe in a second direction and perpendicular to said first direction, said second means being capable of moving said probe in a controlled distance smaller than the wavelength of the photons of said evanescent near-field.

30. The microscope of claim 29 wherein:

said first means for moving said probe further comprises:

a x-direction controller for generating a x-direction signal, said signal having a magnitude that is representative of an x distance in a x direction; and x-direction piezoelectric ceramic bimorphs mounted to said probe which move said probe said x distance in said x direction when said bimorphs receive said x-direction signal from said x-direction controller; and said second means for moving said probe further comprises:

a y-direction controller for generating a y-direction signal, said signal having a magnitude that is representative of a y distance in a y direction; and y-direction piezoelectric ceramic bimorphs mounted to said probe which move said probe said y distance in said y direction when said bimorphs receive said y-direction signal from said y-direction controller.

31. The microscope of claim 23 wherein said means for maintaining said probe at a position of constant light intensity further comprises:

a third means for moving said probe in a direction normal to said surface, said third means being capable of moving said probe in a controlled distance smaller than the wavelength of the light; and means for monitoring the control signal of said detector and for controlling said third means for moving said probe whereby the control signal of said detector is held at a substantially constant level as said probe is scanning said sample area, said third means moving said probe further away from said surface when the control signal increases and said third means moving said probe closer to said surface when the control signal decreases.

32. The microscope of claim 31 wherein said third means for moving said probe further comprises:

a z-direction controller for generating a z-direction signal, said signal having a magnitude that is representative of a z distance in a z direction; and z-direction piezoelectric ceramic bimorphs mounted to said probe which move said probe said z distance in said z direction when said bimorphs receive said z-direction signal from said z-direction controller.

33. The microscope of claim 21 wherein said means for monitoring further comprises:

an optical fiber probe having a tip for being introduced into said near-field whereby photons from said field will be received by said tip, in a number corresponding to the light intensity of the near-field at the position of the tip.

34. The microscope of claim 33 wherein said tip of said fiber probe is partially covered with a photon opaque material and an aperture is formed in the opaque material, said aperture being smaller than the wavelength of the photons being received by said probe.

35. The microscope of claim 33 wherein said means for producing the output signal comprises, in part, a photomultiplier tube mounted at an end of said fiber opposite said tip.

36. The microscope of claim 21 wherein said probe is constructed only of a light conducting substance.

37. The microscope of claim 21 wherein said probe is a quartz optical fiber having a sharpened tip.

38. A photon scanning tunneling microscope comprising:

a source of laser light for providing a beam of laser light;

an optical medium with a substantially flat surface on which a sample area is defined;

means for introducing said beam of laser light into said optical medium, said beam striking an inner side of said surface at an angle that will produce a total internal reflection of said beam, said reflection producing an evanescent near-field adjacent to an outer side of said surface, said field having a substantially exponentially decreasing intensity in a direction perpendicular to and away from said surface;

a probe for sampling said evanescent near-field, said probe being able to receive photons from said near-field, said photons tunneling between said surface and said probe;

a tip on said probe formed into a point for receiving photons tunneling from said surface to said probe;

a photomultiplier for receiving photons from said probe and producing an output signal that is proportional to the number of photons received by said probe;

means for scanning adjacent to said sample area with said probe, said means further comprising:

a x-direction controller for generating a x-direction signal, said signal having a magnitude that is representative of a x-distance in a x-direction which is parallel to said surface;

a y-direction controller for generating a y-direction signal, said signal having a magnitude that is representative of a y-distance in a y direction which is parallel to said surface and perpendicular to said x-direction;

x-direction piezoelectric ceramic bimorphs mounted to said probe which move said probe x distance in said x direction when said bimorphs receive said x-direction signal from said x-direction controller, said bimorphs being operable for moving said probe a controlled distance smaller than the wavelength of the photons in said field; and y-direction piezoelectric ceramic bimorphs mounted to said probe which move said probe said y-distance in said y-direction when said bimorphs receive said y-direction from said y-direction controller; said bimorphs being operable for moving said probe a controlled distance smaller than the wavelength of the photons in said field;

a z-direction controller for generating a z-direction signal having a magnitude that is representative of a distance in a z direction, said z direction being normal to said surface;

z-direction piezoelectric ceramic bimorphs mounted to said probe which move said probe said z-distance in said z-direction when said bimorphs receive said z-direction signal from said z-direction controller;

means for monitoring said output signal of said photomultiplier tube and for controlling said z-direction controller whereby the output signal of said photomultiplier tube is held at a substantially constant level as said probe is moved directions parallel to said surface and whereby said z-direction bimorph moves said probe further away from said surface when the output signal of said photomultiplier tube increases and said z-direction bimorph moves said probe closer to said surface when the output signal of said photomultiplier tube decreases and the distance of said probe from said surface varies as a function of the interaction of said sample area with said surface; and means for producing an output signal corresponding to the x, y and z direction signals.

39. The microscope of claim 38 wherein the intensity of said evanescent near-field changes with a normal distance from said surface substantially according to the equation:

$$I = K \exp\{-2kz[\sin^2\theta_i - (n_t/n_i)^2]^{\frac{1}{2}}\}$$

where:

I = the intensity of said field having units of power/area.

K = a proportionality constant having units of power/area.

k = a magnitude of a wave vector of the incident laser beam having units of inverse distance (1/distance);

z = said perpendicular distance from said surface;

$\theta_i$ = an angle of incidence of said laser beam with a line normal to said surface;

$n_i$ = index of refraction of said prism; and $n_t$ = index of refraction of a medium on said outer side of said surface.

40. The microscope of claim 38 wherein said tip of said fiber is partially covered with a photon opaque material whereby an aperture is formed in the opaque material, the aperture being smaller than the wavelength of the photons received by said probe.

41. The microscope of claim 38 further comprising:

means for determining distances between said probe and said surface while moving said probe in directions parallel to said surface and for generating a distance signal that is representative of said distances;

means for determining positions of said probe in a plane parallel to said surface while moving said probe in directions parallel to said surface and generating a position signal that is representative of said positions; and means for displaying said distance signal as a function of said position signal.

* * * * *